United States Patent [19]
Eron

[11] 3,886,068
[45] May 27, 1975

[54] SEWAGE DISPOSAL SYSTEM
[76] Inventor: Robert E. Eron, 3375 34th Street, North, St. Petersburg, Fla. 33713
[22] Filed: Nov. 12, 1973
[21] Appl. No.: 415,142

Related U.S. Application Data
[63] Continuation-in-part of Ser. No. 233,534, March 10, 1972, abandoned.

[52] U.S. Cl. .................. 210/44; 210/221; 210/73
[51] Int. Cl. ............................................. B03d 1/02
[58] Field of Search ............ 210/15, 44, 50, 63, 13, 210/221, 400, 78, 73; 209/164, 170

[56] References Cited
UNITED STATES PATENTS

| | | | |
|---|---|---|---|
| 3,053,761 | 9/1962 | Bradt | 210/44 |
| 3,537,584 | 11/1970 | MacDonald et al. | 210/400 |
| 3,622,508 | 11/1971 | Komline | 210/10 |
| 3,772,190 | 11/1973 | Eisenmann | 210/44 |
| 3,775,311 | 11/1973 | Mook, et al. | 210/44 |

*Primary Examiner*—Thomas G. Wyse
*Assistant Examiner*—Benoit Castel
*Attorney, Agent, or Firm*—Stein and Orman

[57] ABSTRACT

A system for treating sewage comprising a plurality of independent interconnecting stations which include feeding raw sewage through a slurrier where waste solids are broken down into small particles and fed to a foam generator which generates the slurry into an odorless foam. This foam is pumped to a drain facility where the foam is accumulated and the effluent separated therefrom via a fine wire mesh continuous conveyor through which the effluent is drained or filtered leaving a mat-like residue which is removed from the conveyor into containers. The effluent drains into a reservoir including aerator means which aerate the effluent, after which it is fed into a drain.

4 Claims, 9 Drawing Figures

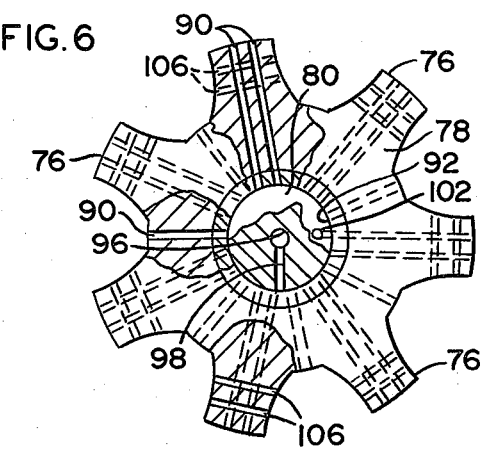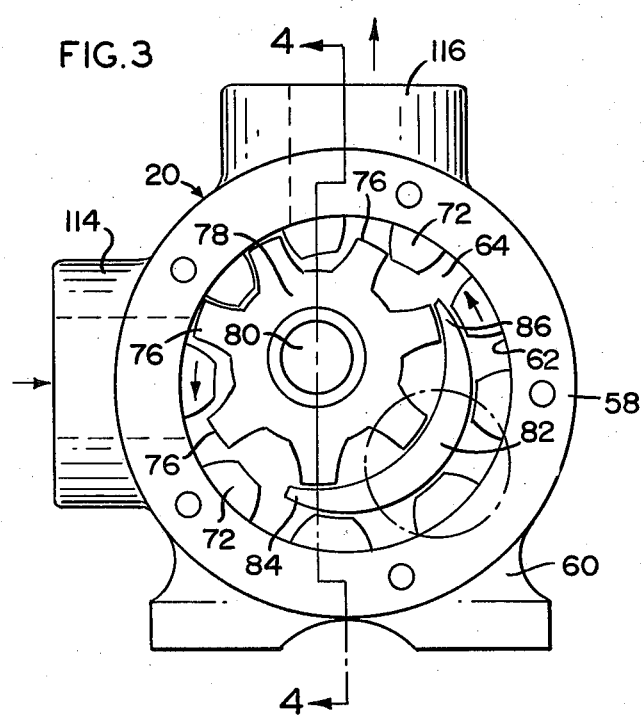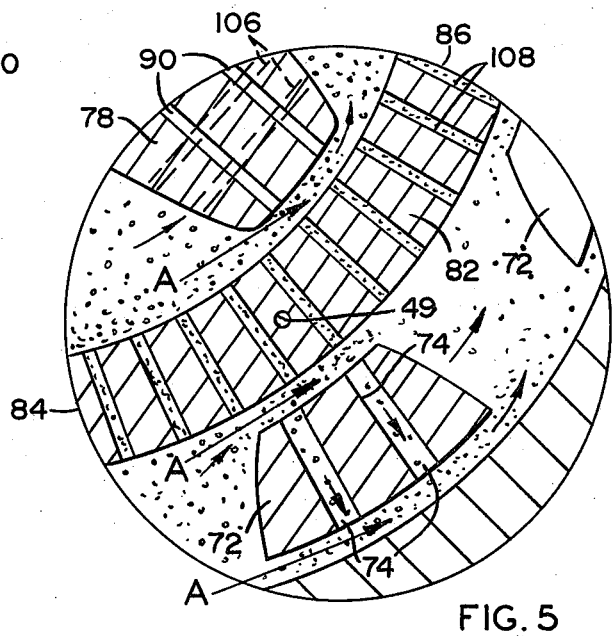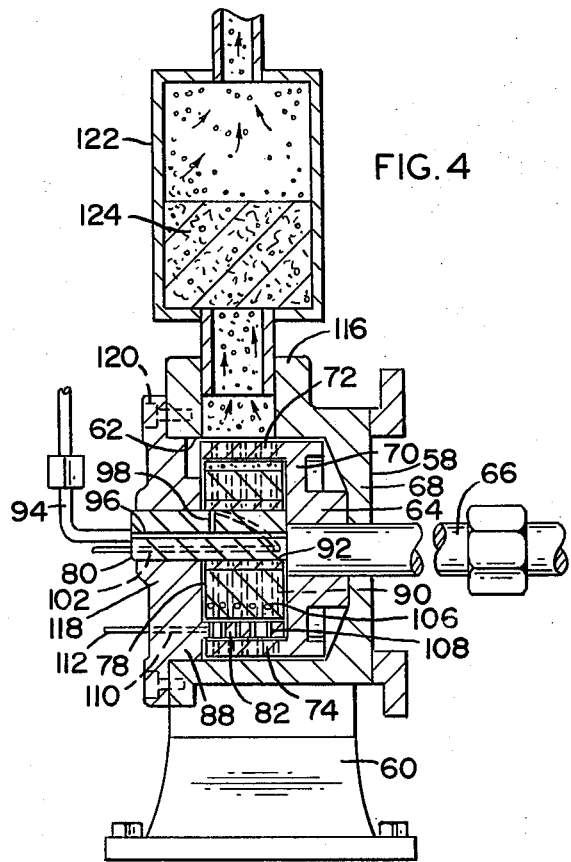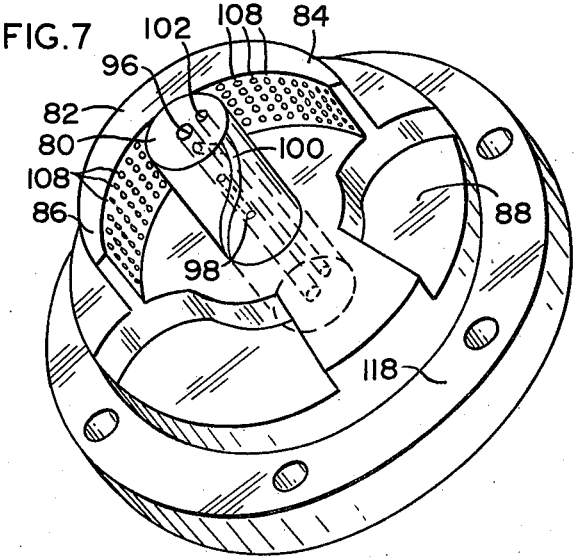

SEWAGE DISPOSAL SYSTEM

This is a continuation-in-part of my co-pending application Ser. No. 233,534, filed Mar. 10, 1972 and now abandoned.

BACKGROUND OF THE INVENTION

1. Field of the Invention

This invention relates to a novel sewage disposal system for uniquely treating both solid and liquid material. It comprises a plurality of interconnected stations which include a slurrier for slurrying the solids of raw sewage which is fed directly thereto, a foam generator which foams the slurry into an odorless foam, a drain facility which drains the effluent from the foam, and an aerator where the effluent is aerated and fed directly into a drain.

2. Description of the Prior Art

In high density population areas, sewage systems commonly comprise a network of pipes or conduits for conveying raw sewage from points of origin, such as houses, factories and other buildings, to a disposal area located a safe distance from the center of population. Then the raw sewage is treated or else directly discharged into rivers, streams, and oceans. Unfortunately, the density of the various centers of population and increased sewage therefrom has caused many such bodies of water to become polluted. In addition, the need for chemical treatment in certain instances, has caused an undesirable emptying of additives, harmful to plant and fish life, into rivers, streams and oceans.

In low density population areas sewage is usually disposed of in the soil using septic tanks and cesspools. As the population increases, however, or as the soil's water table rises, even this technique becomes undesirable, for it is basically unsanitary. As a result, various types of sewage treatment systems have been developed.

One such system filters out the heavy inorganic material with the remaining sewage being exposed to the action of air in a trickling filter. Finally, the sewage is removed from the effluent in a settling tank, dried, and frequently used as fertilizer. The effluent is discarded into rivers, streams and oceans, or into the earth. A second system includes the chemical treatment or digestion of the organic matter. Any remaining solid matter is then filtered off and discarded while the effluent is neutralized and discarded as in the first method.

A third method is the activated-sludge process. Here, sewage is passed through activation tanks which have porous plates or perforated pipes at the bottom. Air is passed through the pipes at low pressure to effect a "boiling" action which keeps the sewage in suspension. Some of the "sludge" is continuously withdrawn into settling tanks where the liquid component is decanted. The remaining thickened sludge is then dried and removed and frequently sold as fertilizer.

Unfortunately, these methods necessitate an elaborate network of pipes, conduits, and even large plant installations. Even then, the process is slow. Furthermore, for "thorough" sewage treatment, additional treatments and massive chemical additives must be utilized before the solids and the liquid effluent may be made usable for subsequent use. The solids retain an odor and the liquid is not pure enough to deposit into existing waterways without an adverse effect on marine life.

Numerous methods and apparatus for treating sewage are known in the prior art. However, such prior art systems are generally overly complex and, unfortunately, inefficient. Representative prior art systems are disclosed in U.S. Pat. Nos. 3,276,994; 3,642,617; and 3,655,046. Similarly, it is well known to add various slurries to a foam for the purpose of separating the solids therefrom, as shown in U.S. Pat. Re. No. 26,449. But nowhere in the prior art does there appear to be a disclosure of a singularly effective apparatus and method for virtually eliminating the problems associated with sewage disposal in today's modern society.

Thus, it is apparent that there is a need for an efficient inexpensive means of sewage treatment and disposal.

SUMMARY OF THE INVENTION

The present invention relates to a sewage disposal system, and more specifically, to a plurality of interconnected stations which, in combination, treat the sewage, both solid and liquid, to produce a mat-like residue, useful as fertilizer or mulch or ground cover and a potable effluent.

Raw sewage is fed from its source through conduit means to a slurrier where the solids are broken up into smaller particulate matter whereby they more uniformly remain suspended in the liquid of said raw sewage. Solids not broken up by the action of the slurrier may be drawn off before the slurry is passed to a foam generator.

Chemicals may be added to the slurrier to disinfect, to improve dissolution of certain matter, to color or to discolor, to deodorize, etc.

The slurry and the receiving fluid, generally air, is fed directly to a foam generator such as that disclosed in my application Ser. No. 96,105, filed Dec. 8, 1970 now abandoned, to produce an odorless foam which is fed to a drain facility where the foam accumulates. The foam generator referred to comprises a method of pumping foam with a rotary pump having an intake for receiving fluid, again generally air, and an outlet for discharging foam. As the pump rotates, the slurry and fluid are drawn into the pump's intake where they are mixed with a predetermined amount of one or more chemicals and a foam solution. While the slurry, fluid, chemicals and foam solution are being pumped, they are forced through a number of bores formed in the pumping elements whereupon bubbles of foam are generated as the solution emerges from these bores. As the pump rotates, various pumping forces cause the foam solution to pass through the bores into the surrounding fluid, whereupon foam bubbles are generated. These bores are suitably formed in the pumping elements with respect to the various pumping forces to gain maximum foam generation. Generation of foam also occurs to a limited extent by the natural turbulence of the fluid and foam solution resulting from the operation of the pump. Additionally, a plurality of chemical input means are provided within the pump housing in order that various chemicals can be placed within and thoroughly mixed within the pump chamber during the periods of foam generation. These chemical inputs are provided with metering means whereby the amount and type of chemical may be preselected and the correct amount placed in the pump housing with each rotation. After being generated, the foam is pumped and subsequently discharged at the pump's outlet, where it is then fed to the drain facility.

A blender means for intermixing additional solids with the foam, such as that disclosed in U.S. Pat. No. 3,682,446, is interconnected between the slurrier, the foam generator and the drain facility. Flow control means which may comprise one or more valve means are arranged in predetermined flow regulating relation to the slurrier, foam generator and blender. By virtue of the placement and operation of the flow control means, solid matter removed from the slurrier may be added to the foam through the blender. Conduit means are also provided whereby solid matter from an external source may be added to the foam. Of course, it must be pointed out that the blender must be of a type which will intermix foam with various solid materials without causing a breakdown of the foam structure. Similarly, it should be noted that by virtue of the placement and operation of the valve means, it is possible to by-pass the blender system and to pass foam directly to the drain facility without the addition of solid materials thereto.

The drain facility includes a separator means such that the effluent drains from the foam. In the preferred embodiment, the separator means comprises a continuous perforated mesh conveyor onto which the foam is deposited. The effluent passes through the mesh as the solid particles are trapped thereon. These particles quickly dry and form a matted product. After drying, the matted product is carried to a loading station for packaging for sale as mulch, fertilizer, etc.

The effluent is drained into either a reservoir or a conduit or a canal which leads directly to a drain, where the effluent is aerated to purify it. Aeration of the effluent is accomplished by a liquid aerator and water treatment device such as that disclosed in U.S. Pat. No. 3,653,641. The use of the aerator specified is particularly desirable because of its ability to produce very efficient transfer of oxygen and/or other chemicals to the effluent in that the aerated effluent is introduced at the bottom of the reservoir, thereby inducing an outward and upward flow of treated effluent at the reservoir base. More specifically, this aerator contemplates the provision of a rotatable impeller located at the upper end of an intake tube to sling effluent outwardly from the tube with considerable turbulence, thereby increasing the interfacial exposure of the effluents to the particular surrounding atmosphere within the device.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which:

FIG. 3 shows an end view of the foam generator with parts exposed to show the relationship of the pumping member.

FIG. 4 is a cross-sectional elevational view of the foam generator along the lines 4—4 of FIG. 3.

FIG. 5 is a cross-sectional enlarged view of the designated circular area in FIG. 3.

FIG. 6 is a cross-sectional view of the idler with the foam producing bores exposed.

FIG. 7 is a perspective view of the end cover of the foam generator showing the manner of distributing the foam solution.

Similar reference characters refer to similar parts throughout the several views of the drawings.

DETAILED DESCRIPTION OF THE PREFERRED EMBODIMENT

Figure 1:
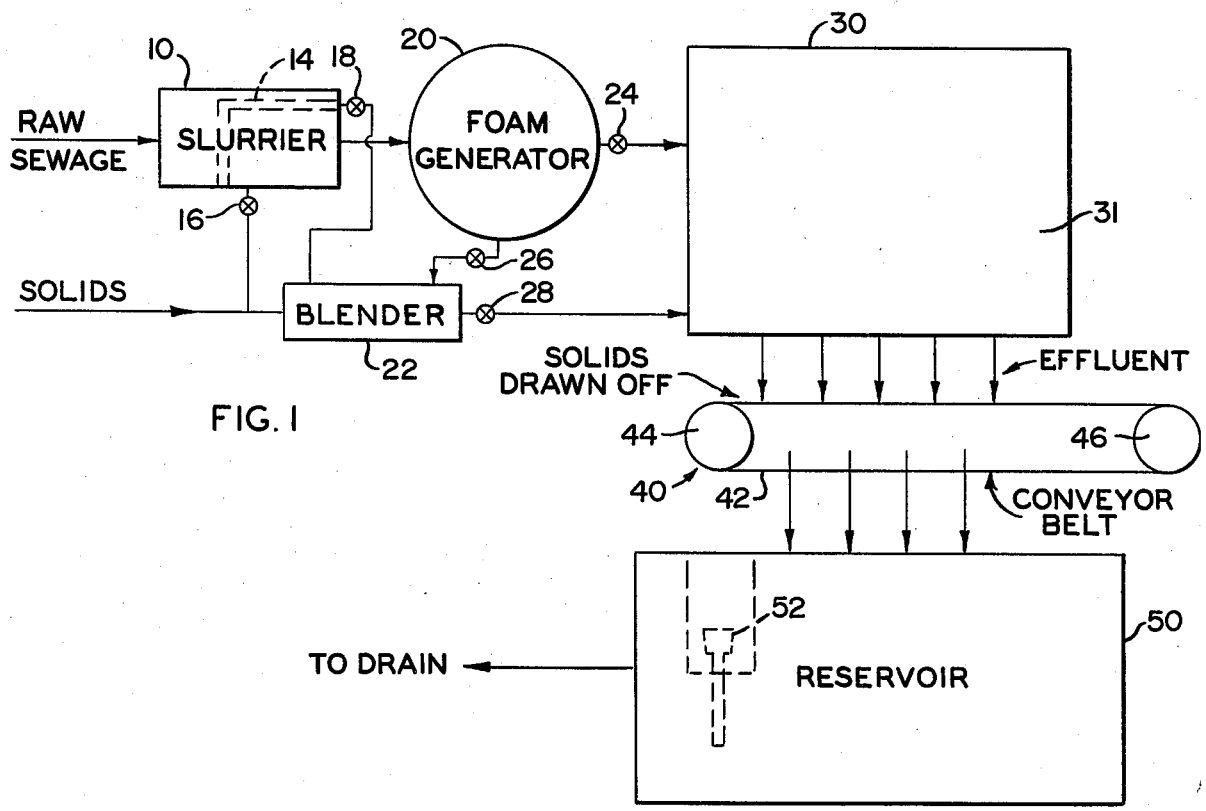
FIG. 1 is a schematic representation of the present invention.

As shown in FIG. 1, the sewage disposal system of this invention comprises a plurality of interconnected elements which, in combination, treat the sewage to produce a useful mat-like product and a potable effluent.

The sewage is fed directly to slurrier 10 whereby the solids are broken up into small particles and are more evenly suspended in the liquid. The slurrier may also include means whereby heavy solids, not broken down under the action of the slurrier, may be systematically removed from the bottom of the tank while lighter solids are skimmed off the top by skimmer 14. Further, the slurrier may include means for introducing additives for various purposes.

The resultant slurry is then fed to foam generator 20 through a first output means where it is combined with a receiving fluid, generally air, to generate an odorless foam. The foam is then fed to a drain facility 30 including an accumulating chamber 31.

A blender means 22 is interconnected between slurrier 10, foam generator 20 and drain facility 30 by flow control means which may comprise valve means 16, 18, 24, 26 and 28. More particularly, valve means 16 and 18 are connected in direct communicating relation with a second and third output means which serve to direct solids from slurrier 10 into blender 22 as shown in FIG. 1. In addition, valve means 24 is connected in fluid communication to a first foam output interconnecting foam generator 20 and drain 30. Valve means 26 is connected in communication with a second foam output through which foam passes from generator 20 to blender 22. Valve means 28 is connected to a blender output through which the blended product from blender 22 passes to the drain means 30. It should be noted that any type of conventional valve structure or like device may be utilized as the flow control means taking into consideration that the flow control means must be capable of regulating the flow of the type of material specified herein. In order to utilize blender means 22, valve means 24 is closed and valve means 16, 18, 26 and 28 are opened. Heavy solids not broken up by slurrier 10 are removed through valve means 16, and lighter solids skimmed off the top by skimmer 14 are removed through valve means 18. These solids are then fed to blender system 22. Of course, additional solids from an external source (not shown) either to regulate the size of solids passing to drain facility 30 or to introduce additional solid waste to the system, may also be fed to blender means 22, as shown in FIGS. 1 and 2. Foam is fed to blender means 22 through valve means 26, where it is mixed with the additional solid materials. The resultant foam-solid blend is then passed through valve means 28 to drain facility 30. Of course, it should be obvious that when valve means 24 is opened and valve means 16, 18, 26 and 28 are closed, no additional solid materials are added to the foam prior to its discharge into drain facility 30.

Drain facility 30 drains onto separator 40 where the solids are separated from the effluent liquid of the foam. Separator 40 comprises a continuous conveyor belt 42 which is mounted on drive cylinder 44 driven by external means (not shown) and idler cylinder 46. As the foam falls onto the upper surface of the conveyor belt 42, the liquid passes through the mesh and into reservoir 50. The solids are captured on the fine wire mesh of the conveyor belt 42, dried and conveyed toward one end of the conveyor. The dried solids are then removed and placed into a suitable container for transportation from the area. These solids may be separated from the conveyor belt 42 by means of air jets disposed immediately behind and above drive cylinder 44 which shear the solids therefrom.

Figure 2:
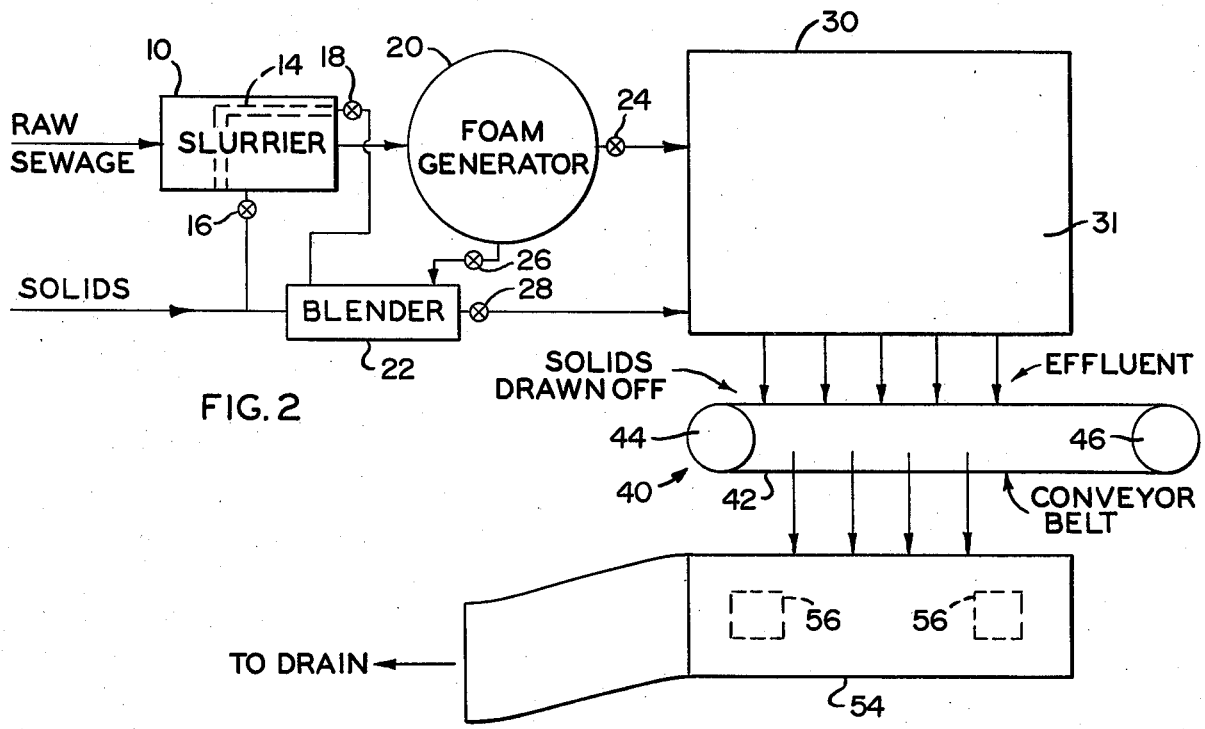
FIG. 2 shows an alternative embodiment.

The effluent in reservoir 50 is aerated by aerator 52 to purify it. As an alternative to reservoir 50, a conduit or canal 54, as seen in FIG. 2, may be used with a plurality of aerators 56 spaced therein. The output of the canal 54 is fed directly to a drain.

As best seen in FIGS. 3 and 4, the foam generator generally indicated as 20 comprises a housing 58 made of suitably shaped casting metal or plastic which is supported on a pedestal 60. The housing has an inner cylindrical surface 62 defining a pumping chamber which rotatably receives a rotor 64. Rotor 64 is keyed to drive shaft 66 extending through a suitable opening formed in an integral end 68 of housing 58. The general form of rotor 64 is best shown in FIGS. 3 and 4 and includes a disk-shaped support plate 70 for supporting a plurality of circumferential teeth 72 of the general shape shown. Each of these teeth has a series of substantially small radial bores 74 (see FIGS. 4 and 5) extending therethrough for receiving a predetermined mixture of fluid, chemicals and foam solution. The rotor 64 rotates concentrically with the cylinder wall 62 and is slightly spaced from the wall for a suitable rotating clearance without substantial drag on the wall.

Meshing with teeth 72 of the rotor are teech 76 of an idler 78 positioned and rotatably mounted as shown on idler support pin 80. The shapes of the teeth 72 and 76 respectively are so arranged as to mesh properly with one another and provide a pumping action, hereinafter described, in combination with a crescent-shaped partition 82 having a forward end 84 and rearward end 86. Both the partition 82 and support pin 80 are mounted on a disk-shaped support plate 88.

Referring now to FIG. 6, idler 78 is shown having a plurality of small radial bores 90 extending from the interior wall 92 of idler 78 and communicating with the interior of pump housing 58. Bores 90 are utilized to transmit chemicals, fluid, and foam solution from a remote location to the interior of pump housing 58. The chemicals and foam solution are delivered to pump housing 58 by a pipe, such as conduit 94, from a suitable source (not shown). Conduit 94 is connected to a longitudinal bore 96 drilled in idler pin 80. Longitudinal bore 96 communicates through a plurality of radial passages 98 to a slot 100 (see FIG. 7) located on the surface of idler pin 80. The arrangement is such that an idler 78 rotates slot 100 will sequentially cover and uncover depending upon the arrangement of radial bores 90 and idler 78. When a portion of slot 100 is uncovered, the internal pressure in line 94 together with the slot 100 will cause a metered amount of liquid to flow into pump housing 58. It is also contemplated that a second longitudinal bore 102, with radial passages 98 or even additional longitudinal bores (not shown) be utilized to place different chemicals in different metered amounts into pump housing 58.

In addition, small transverse bores 106 are also formed in teeth 76. These bores 106 are conduits through which is forced the fluid, chemicals, and foaming solution when teeth 72 of rotor 64 are forced into the interdental spaces between teeth 76 of idler 78. This pressure differential between the adjacent interdental spaces causes a violent sloshing and mixing to take place.

Pin 80 and mounted idler 78 have an axis that is parallel to but eccentric with respect to the axis of rotor 64. This eccentricity creates a crescent space between the idler and rotor which is substantially filled by the crescent-shaped partition 82. Rotational clearance is provided between the teeth of the rotor and idler and crescent 82. Crescent partition 82 has similar bores 108 in order that further sloshing and mixing of the constituent elements, as described above, will take place. In addition to crescent partition bores 108, a plurality of inlet bores 110 are provided which are arranged such that they communicate with the outside of pump housing 58. These bores 110 and their associated conduits 112 are attached to chemical or fluid supply sources together with suitable, standard control and metering means such that by preselection, a predetermined amount of chemical of fluid can be placed in pump housing 58 through conduits 112 and bore 110.

Referring now to FIG. 3, an inlet port 114 for receipt of slurry and fluid from slurrier 10 and an outlet port 116 for discharge of foam to drain facility 30 are formed in housing 58 as shown. As mentioned, supra, idler pin 80 and crescent partition 82 are carried on support plate 88. This support plate is formed with two diameters. The smaller diameter is slightly less than the diameter of inner cylinder 62 of pump housing 58 and fits snugly into the cylinder 62 as shown in FIG. 4. The outer diameter of the disk-plate forms a cover plate 118 which is removably secured by bolts 120 to housing 58.

Removably attached to the discharge outlet 116 of the pump is a cylindrical foam accumulator 122 having a reduced neck portion for insertion into the outlet. Riding within the accumulator is a stainless steel wire mesh or plastic sponge plug 124. The wire mesh plug 124 acts as a resistance to the discharge of the foam and performs two operations: it smooths the pulsations of foam being emitted from the pump, thus maintaining a flow of foam at a uniform rate; and compacts the foam to a desired density which also assists in preventing the foam from billowing out of or leaving the pump too soon. The size of the wire mesh or resistance is determined by the density of the foam desired but is always of such size as to pass the foam without undue impedance. In practice, it has been found that without the resistance in the discharge, an appreciable amount of foam solution is discharged as well as foam. With the resistance in place, only foam is discharged.

In operation, drive shaft 66 rotates rotor 64 when a prime mover is started. Since teeth 72 of rotor 64 are meshed with teeth 76 of idler 78, rotation of the rotor simultaneously rotates idler 78. As they rotate, a fluid such as air or the like and slurry is admitted at intake 114, and foam solution is passed under a desired pressure through one of the inlet ports such as longitudinal bore 96, passageway 98, distribution slot 100 and finally through idler bores 90.

In addition metered amounts of chemicals in liquid form or in solution are selectively fed, in predetermined amounts, into pump housing 58 either through other longitudinal slots in idler pin 80 or by other inlet bores 110 located in crescent 82 or in the walls of pump housing 58. Thus, the input chemicals will be thoroughly mixed and disseminated in the foam generated in pump housing 58. As the foamed solution emerges from the bores 90, part of the solution bubbles into foam but a substantial portion still remains as a solution. Thus, as the rotor 64 rotates, additional fluid is drawn into the intake 114 and there combined with additional foam solution and chemicals which are being added.

As the pumping cycle continues, generation of the foam continues by various means. Cross bores or transverse bores 106 of idler 78 assist in the generation of foam. As the idler rotates, some of the remaining foam solution in the idler teeth cavities flows through the idler cross bores due to a difference of pressure in the interdental cavities of the idler and/or the solution's inertia. When the solution emerges from the bores, bubbles of foam are formed and the chemicals are thoroughly mixed.

Bores 74 in rotor teeth 72 also assist in foam generation. As the rotor rotates, a centrifugal force is created in any foam solution caught in the bores. This, coupled with a Bernoulli suction effect, draws the solution outward, and as it emerges from the rotor bores bubbles into foam. These bubbles of foam also act to seal the rotating clearance between the rotor and cylinder wall 62.

During a portion of the pumping cycle in which the idler and rotor carry the foam, fluid, remaining foam solution and chemicals along the crescent partition, both the idler and outer rotor form cavities or pockets between their teeth and the partition, as easily seen in FIG. 3, which carries foam, fluid, foam solution and chemicals forwardly. At this portion of the cycle, as best seen in the enlarged view in FIG. 5, an additional means of generating foam is provided by bores 108 in the crescent partition. Due to inherent characteristics, the pressure of the fluid, foam, foam solution and chemicals in the pockets of the idler will be different than a similar pressure between the pockets of the rotor. Consequently, the foam solution will flow through the crescent bores 108 to the side having the least pressure. As the solution emerges from the bores, it bubbles and more foam is generated. In addition, as the idler and rotor sweep past the crescent bores, a suction effect is created which pulls out foam solution in the bores which generates even more foam (see arrows designated A, FIG. 5). This foam also acts to seal the rotating clearance between the crescent and the idler and rotor.

As the idler and rotor teeth pass the rearward end 86 of crescent shaped partition 84 the foam solution has been substantially changed to foam and when the teeth begin to mesh together and reduce the volume available for the foam, it is forced under pressure through the outlet. The wire mesh 124 in the accumulator 122, acts as a resistance to return and compacts and smooths the flow of the foam being discharged.

Figure 8:
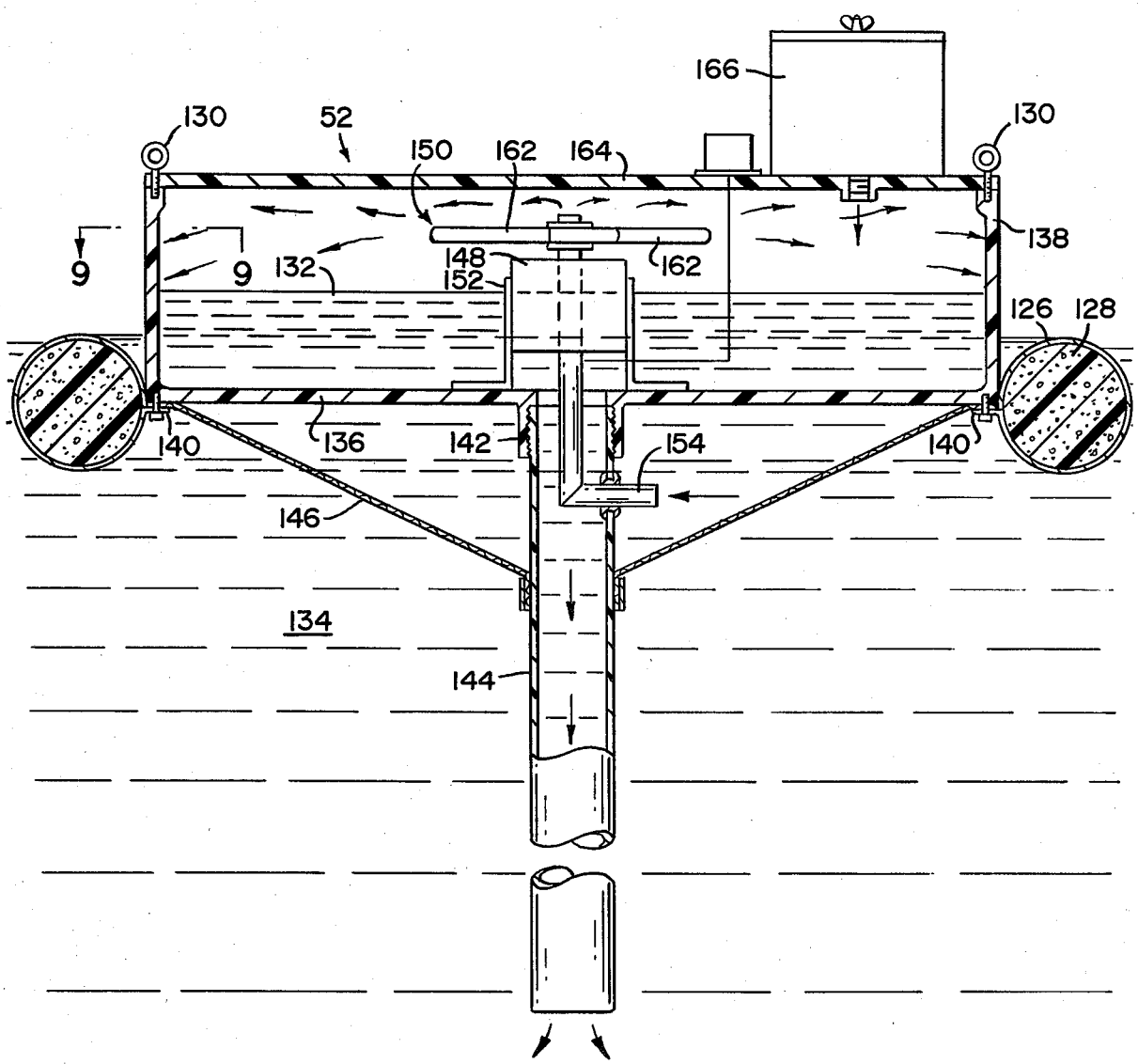
FIG. 8 is a cross-sectional view of the aerator of the present invention.
Figure 9:
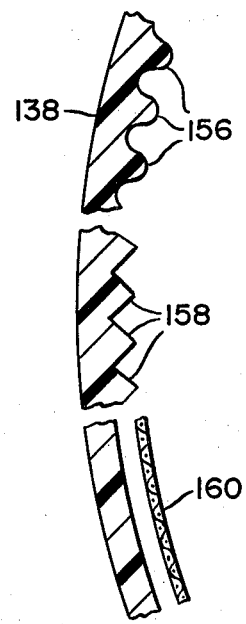
FIG. 9 is a top view of the aerator taken through lines 9—9 of FIG. 8.

As best seen in FIGS. 8 and 9, aerator 52 is shown for purposes of illustration floating on a body of ambient liquid 134 such as the effluent in reservoir 50. Aerator 52 is supported at the top surface of the water by a float 126 which may be of any generalized type. Here, float 126 is shown filled with polyurethane foam 128. To moor aerator 52 in a given location, a cable (not shown) may be attached to hooks 130 which are placed about the periphery of aerator 52. Float 126, here shown to be generally toroidal in shape, is attached by any conventional means at the base of aerator 52 so as to allow aerator 52 to float even when the level of treated water 132 is substantially higher than the level of the ambient water 134.

Aerator 52 comprises a generally circular base 136 to which float 126 is fixedly attached. About the periphery of base 136 is an upwardly extending side wall 138. Side wall 138 is fixed to the periphery of base 136 by a plurality of clamps 140 such that there is a substantially liquid tight seal. The center of circular base 136 has a downwardly extending annular flange 142 threadedly attached to communicating means such as a tube 144 and arranged such that aerated water 132 will flow down through tube 144 when the water level within flange 142 is higher than the outside water level. Base 136, side wall 138 and tube 144 define the aerated water retaining means which prevents the mixing of aerated water 132 with ambient water 134. In addition, a generally conical screen 146 may be provided which is connected to the periphery of base 136 and to tube 144 and used to screen out particular matter. Ambient water 134 is drawn into aerator 52 by the intake pumping action of motor 148 and is slung out horizontally by suitable spraying means such as rotating impeller 150. Motor 148 is centrally located on and supported by motor mounts 152 to base 136. The ambient water 134 enters through a right angle cylindrical tube 154 which is disposed within and is fixedly attached through the side wall of tube 144. The tubes may be aerated water retaining means made of polyethylene or any other suitably rigid, corrosion resistant material. The water is slung horizontally outward by rotating impeller 150, as shown in FIG. 8, thereby forming water droplets which increase aeration.

The interior of side wall 138 may be relatively smooth as shown in FIG. 8 or it may be provided with a number of various surface configurations such as corrugated wall 156, sharpened triangle and crest shaped wall 158 or even a screen mesh 160 which is held in spaced relation to side wall 138 by suitable brackets (not shown). These irregular surfaces further increase the turbulence and interface contact of the droplets and the atmosphere within the device.

In accordance with the present invention, therefore, increased efficiency of pumping and increased oxygen and other chemical absorption are achieved with a low cost construction, floating aerator. Increased oxygen absorption is also accomplished by increasing water turbulence in the air by impinging water against the interior of side wall 138. Also, the motor 148 is submersible and the impeller is hydrodynamically balanced. In carrying out this hydrodynamic balancing, the impeller is formed symmetrically about the axis of the shaft and each of the impeller blades 162 is profiled in a precisely identical manner, not only to afford a constant volume flow of water across the length of each individual blade, but also to cause each blade to pump the same volume of water as every other blade. It has been found that increased pumping efficiency is achieved by this type blade construction.

As impeller 150 rotates, the water particles are slung outwardly causing molecular disturbance whereby noxious gases in the water are released and replaced by oxygen from the air. The impinging of the water particles on the interior of side wall 138 may be considered as a shearing action which produces high molecular turbulence and agitation, thereby increasing the rate of transfer of gases. Also, any solid particles impinging on the interior of side wall 138 are given a scrubbing action of increased magnitude as compared with the prior art which teaches impingement against the water surface itself.

When it is desired to place a chemical or a gas into the body of water, a top 164 may be attached to the top periphery of wall 138 in order to prevent evaporation or pollution of the surrounding air.

In addition, it is contemplated that a foam generator generally shown at 166 or some other means of chemical dispensing be utilized to place chemicals or the like into the surrounding water without a great deal of evaporation. There is an additional advantage that if a strong, concentrated chemical is placed in water treator 52, there is a no chance for the chemicals to pollute the atmosphere or to burn the surrounding plants and fish before it is sufficiently diluted.

To aid in the understanding of the invention, a brief description of the operation of the aerator is given hereafter. The submersible motor 148, here, electric, is connected by suitable cable (not shown) to a source of electricity (not shown) and float 126 is disposed in reservoir 50. With the motor operating, the impeller shaft (not shown) is driven to turn impeller 150 and pump water upwardly through cylindrical intake tube 154. It has been found that a rated motor of between one-quarter and one-half horsepower will enable 50–100 gallons per minute to be pumped and slung horizontally from impeller 150. The slinging action of impeller 150 causes turbulence and interaction with the surrounding atmosphere within the device to release gases trapped in the water which are exchanged for oxygen or other chemical atmosphere in the device. As the level of the treated water 132 rises above that of the ambient water 134, a flow is caused downwardly through tube 144 to the bottom of the body of water, as indicated by the arrows in FIG. 8. The rate of flow of such treated water 132 is a function of the gallon per minute input rate of motor 148 and the diameter of tube 144.

In addition, it is contemplated that the device be covered in order that the device may be filled with foamed or gaseous chemicals such that transferring of these chemicals to the sprayed water be facilitated.

It is further contemplated that means be provided to add liquid chemicals to the intake section of the pump whereby these chemicals be sprayed along with the ambient water thereby precluding a concentration of the chemicals from flowing out into the surrounding environment.

It is important to note that because of the efficiency and rapid treatment of the sewage in the structure and system of this invention, there is no large accumulation of waste product. Accordingly, it is possible to integrate such structure and system into large apartment dwellings or office buildings to greatly reduce the overall load on the community sewage system. In addition, the area needed for treatment and drying is substantially less than the digestive process commonly associated with current raw sewage disposal. Further, due to the purified state of the effluent feeding from the reservoir 50, the effluent may be readily introduced to various bodies of water without the damage of pollution as well as recycled with a minimum of treatment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described, what is claimed is:

1. A sewage disposal means for treating raw sewage, said system comprising: slurrier means for breaking up solids in the sewage into small particulate matter, connected to a source of raw sewage, said slurrier means including more than one withdrawal means disposed therein for separating said solids not effectively broken up by the action of said slurrier; said slurrier means comprising an output, foaming means for generating a foam interconnected in communicating relation with said slurrier means through said output; said slurrier means comprising at least a first and second withdrawal means, blender means for intermixing additional solids with foam produced by said foaming means interconnected to said slurrier means through both said first and second withdrawal means, said first and second withdrawal means disposed and configured in predetermined relation to said slurrier means whereby solid material of different dimensions is selectively transported to said blender means, a first foam output means interconnected between said foaming means and said blender means, whereby foam may be selectively transported to said blender means, a drain means for collecting output from said blender and said foaming means, a second foam output means interconnected between said foaming means and drain means, blender output means interconnected between said blender means and said drain means; flow control means disposed in fluid communicating and regulating relation with said slurrier means, said foaming means, said blender means and said drain means; whereby sewage under treatment can be selectively directed to said drain means from its source, successively through said slurrier means and said foaming means or alternately, through said blender means dependent upon the existence of solids in said sewage being treated, said disposal means further including aerator means disposed in fluid receiving relation to said drain means, whereby effluent passing through said aerator means from said drain means is purified.

2. A sewage disposal system as in claim 1 wherein said drain means including an accumulating chamber connected to the second foam output means; separator means comprising a continuous conveyor of fine mesh material disposed in spaced, substantially transverse, communicating relation to the output of said drain means, said conveyor oriented and configured to dispose its outer and inner surface to the dying effects of the atmosphere circulating about it, whereby the discharge from said output of said drain means is separated into a dried, mat-like product and effluent; and a reservoir means disposed in spaced, substantially transverse, communicating relation to said separator means to collect said effluent, said reservoir means including said aerator means to purify said effluent and a reservoir drain to dispose of the purified effluent.

3. A sewage disposal system as in claim 1 wherein said blender means comprises input means interconnected in communicating relation to a source of solids, said flow control means disposed in said system relative to said slurrier means, foaming means, blender means and drain means such that solids may be selectively added to the output of said slurrier means and said foaming means through said blender means.

4. A process for treating sewage of solid and liquid form, said process comprising sequentially:
 a. slurrying the sewage;
 b. separating out solids not effectively broken up by said slurrying;
 c. feeding said separated solids into a blender;
 d. feeding additional solids into the same blender;
 e. feeding the resultant slurry from slurrying the sewage into a foam generator;
 f. foaming said slurry;
 g. blending said separated solid, said additional solids and the resultant foam from the foam generator;
 h. draining said foam through a separator means;
 i. collecting said solids present in said foam on a separator means;
 j. drying said solids;
 k. conveying said dried solids to a loading station;
 l. collecting an effluent liquid passing through said separator means in a reservoir means;
 m. aerating said effluent in said reservoir means; and
 n. discharging said aerated effluent through a discharge.

* * * * *

UNITED STATES PATENT OFFICE
CERTIFICATE OF CORRECTION

Patent No. 3,886,068  Dated May 27, 1975

Inventor(s)  Robert E. Eron

It is certified that error appears in the above-identified patent and that said Letters Patent are hereby corrected as shown below:

Column 5, line 47, delete "teech" and insert therefor --teeth--.

Column 6, line 1, delete "an" and insert therefor --as--.
Column 10, line 11, delete "damage" and insert therefor --danger--.

Column 11, line 6, delete "dying" and insert therefor --drying--.

Signed and Sealed this ninth Day of December 1975

[SEAL]

*Attest:*

RUTH C. MASON
*Attesting Officer*

C. MARSHALL DANN
*Commissioner of Patents and Trademarks*